United States Patent [19]

Weiss et al.

[11] Patent Number: 4,680,106

[45] Date of Patent: * Jul. 14, 1987

[54] ELECTRODYNAMIC METHOD FOR SEPARATING COMPONENTS OF A MIXTURE

[75] Inventors: Louis C. Weiss; Devron P. Thibodeaux; Mary Ann Godshall, all of Metairie, La.

[73] Assignee: The United States of America as represented by the Secretary of Agriculture, Washington, D.C.

[*] Notice: The portion of the term of this patent subsequent to Aug. 13, 2002 has been disclaimed.

[21] Appl. No.: 761,113

[22] Filed: Jul. 31, 1985

Related U.S. Application Data

[63] Continuation-in-part of Ser. No. 527,730, Aug. 30, 1983, abandoned.

[51] Int. Cl.[4] .............................................. B03C 7/00
[52] U.S. Cl. ..................................... 209/1; 209/127.1
[58] Field of Search ..................... 209/1, 127.1–127.4, 209/128–131, 212–214; 361/233; 250/284, 290, 293; 55/146

[56] References Cited

U.S. PATENT DOCUMENTS

| | | | |
|---|---|---|---|
| 3,801,869 | 4/1984 | Masuda | 361/233 |
| 3,872,361 | 3/1975 | Masuda | 361/233 |
| 3,970,905 | 7/1976 | Itoh et al. | 55/146 |
| 4,252,571 | 2/1981 | Reilly | 127/9 |
| 4,512,879 | 4/1985 | Attia et al. | 209/127.2 |
| 4,534,856 | 8/1985 | Weiss et al. | 209/1 |
| 4,556,481 | 12/1985 | Hepher | 209/214 |

OTHER PUBLICATIONS

Masuda, Senichi, Koichi Fujibayashi and Kengo Ishida; "Electrodynamic Behavior of Charged Particles in Nonuniform Alternating Fields and its Application in Dust"; *Staub–Reinhault. Luft.*, vol. 30, No. 11, (Nov. 1970).

Weiss, Louis C. "Electrodynamic Behavior of Textile Fibers", *Textile Research Journal*, vol. 52, No. 1, (Jan. 1982).

*Primary Examiner*—Randolph A. Reese
*Assistant Examiner*—Donald T. Hajec
*Attorney, Agent, or Firm*—M. Howard Silverstein; David G. McConnell; Raymond C. Von Bodungen

[57] ABSTRACT

A method for separating components of a mixture containing particles which can be electrically charged from particles which can be only negligibly charged is disclosed. The mixture is fed onto an electric undulating traveling wave contact panel which is energized to a charging potential using A. C. voltage. The voltage is then increased to a separation voltage to effect levitation and movement of the charged particles away from the uncharged particles. Separation is accomplished by cycling the voltage between the separation and charging voltages until the charged particles are moved off the panel and the uncharged particles remain on the surface of the panel. The separated particles can then be collected separately.

8 Claims, 1 Drawing Figure

ELECTRODYNAMIC METHOD FOR SEPARATING COMPONENTS OF A MIXTURE

CROSS REFERENCE TO RELATED APPLICATIONS

This is a continuation-in-part of application Ser. No. 527,730, Filed Aug. 30, 1983 which was allowed on 05/07/85, now U.S. Pat. No. 4,534,730.

BACKGROUND OF THE INVENTION (1) Field of the Invention

This invention relates to methods for separating components of mixtures by means of electrodynamic forces.

(2) Description of the Prior Art

Previously, separation of a mixture into its components has been accomplished by means of various methods including the following: mechanical separation, such as screening, sifting, gravity, pneumatic, etc.; chemical methods, such as floating, skimming, treating, etc.; electrical methods such as electrostatic drums, rotations, etc. All of these methods entail some combination of factors which involve acting on differences in size, size distribution, shape, moisture content, mass, charge, composition of matter, etc.

Masuda, S., Fujibayashe, K., and Ishida, K. "Electrodynamic Behavior of Charged Aerosol Particles in Nonuniform Alternating Fields and Its Application in Dust Control", Staub-Reinhalt. Luft. 30, 4–14 (1970), reported a method of transporting material by means of electrodynamic forces. However, separation of components has never been done using A.C. electrodynamic forces prior to applicants' discovery.

Bone char in its granular form was used to refine sucrose in 1828 in Paris by a confectioner named Dumont. For well over a century following Dumont's discovery, granular bone char was the main decolorizing agent in all sugar production.

Granular carbon, developed by the Pittsburgh Coke and Chemical Company, entered the market for sugar decolorizing absorbents in the 1950's and found wide application in the following decades. However, the advantages of granular carbon, particularly its intense decolorization powers and small capital equipment requirement, do not overcome the advantages of bone char which are absorption of organic and inorganic material.

Calgon Corporation uses a process of mixing granular activated carbon and char for decolorizing and deashing cane sugar liquors (U.S. Pat. No. 4,252,571, 1981). However, in this process it is necessary to separate service bone char and granular carbon.

Bone char and carbon differ greatly in their physical properties of hardness, attrition rate, particle size, shape and regeneration temperature. The loss of one component; i.e. carbon, at a greater rate than the other, is to be expected during service and regeneration. To make up such a loss a method is required to determine what percent of granular carbon remains in the admixture after regeneration. In addition, sugar refining requires a knowledge of activity of absorbents and the effectiveness of regeneration. Thus, separation of bone char and granular carbon components is greatly desired.

At present, a water separation procedure is employed to determine the percentage of components in a bone char-carbon mixture. The mixture is placed in a column and water is pumped upward through the absorbents, fluidizing the bed. The upper layer is presumed to be carbon and the lower layer char. The majority of the material in the middle of the column is a mixture which is discarded. The upper and lower cuts are analyzed. In discarding the middle layer, nonrepresentative results are obtained.

This method has inherent problems since bulk density and particle size will be the major contributing factors in water separation. Bone char and carbon particles have a wide overlapping of size and density. This results in a carry over of a mixture of the two components resulting in unacceptable char-carbon combination.

SUMMARY OF THE INVENTION

A method for separating components of a mixture containing particles which can be charged from particles which can only be negligibly charged is disclosed. The mixture is fed onto a horizontal electric undulating traveling wave contact panel. The panel is energized with sufficient A.C. voltage for sufficient time to impart a different charge-to-mass ratio to the individual particles. The voltage is increased for sufficient time to effect separation of the particles. This separation voltage is defined as that which is necessary or sufficient to move the charged particles away from the negligibly charged particles. The particles are separated then by cycling the voltage between the charging and separating voltages until all of the charged particles are moved off of the panel and the uncharged particles remain on the surface of the panel. The separated particles are then collected separately.

DESCRIPTION OF THE PREFERRED EMBODIMENTS

Figure 1:
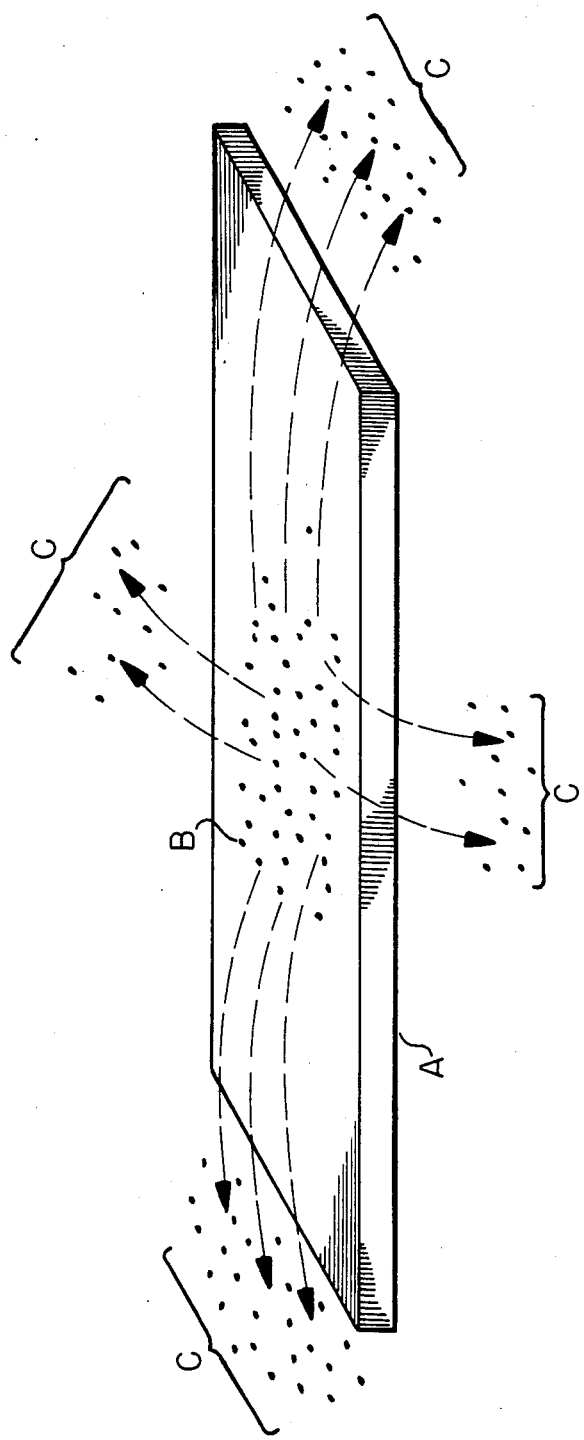
FIG. 1 is an isometric diagram describing the method by which carbon is separated out of mixture with bone char.

Separation of bone char and granular carbon is accomplished by the dynamic forces resulting from an electrical field that is created by a set of parallel electrodes encased in a plastic panel and connected to a three phase A.C. power supply FIG. 1, letter A. When a mixture containing particles which can be charged and particles which can be only negligibly charged is placed on a panel in the area of particles B, particles B with the greatest insulating properties (such as char) are negligibly charged and therefore remain essentially stationary. More conductive particles C (such as carbon) are highly charged and actively levitate, separate from the negligibly charged particles and move off the panel in all directions as shown by the arrows.

This separation or sorting of components is dependent mostly on charge-to-mass ratio. The electric contact panel used in applicants' invention was designed and built by Masuda and is described in U.S. Pat. No. 3,801,869 and the disclosure of which is hereby incorporated by reference.

In the Masuda undulating traveling wave contact panel, parallel sets of individual conductors connected to an A.C. electrical source form an undulating electric field in the surrounding air. If particles possess electrical conductivity significant electrical charges are established on these particles. Particles without electrical conductivity remain uncharged.

When three phases of an A.C. voltage are connected successively to the different conductors encased in the panel, a series of traveling electric waves is created. Charged material levitated within the field is carried along as if on an invisible conveyor. Uncharged material remains stationary on the surface of the panel. Conductive carbon particles tend to become highly charged and therefore, move rapidly in all directions off the panel.

The panel used in the preferred embodiment is 0.1 m² in area with a 3 mm spacing between grid conductors. The power source is 60 Hz, three-phase, high voltage supply continuously variable between 0 and 30 kV. Details of the electrical circuit, its operation, and panel construction are published [Weiss, L. C., "Electrodynamic Behavior of Textile Fibers", *Textile Research J.* 52, 59–65 (1982)] and the disclosure of which is hereby incorporated by reference.

METHOD

Some sugar cane refiners use a mixture of granular carbon and bone char to decolorize sugar solutions. The result is a mixture of used bone char and granular carbon which must be separated into components after regeneration. The preferred embodiment of this invention describes a method for electrodynamically separating the char from the carbon so that the char can be purified and reused.

Samples of bone char and granular carbon were obtained from a sugar refinery. Granular carbon samples used were obtained from Calgon Corporation. Compositions of char and carbon samples were determined using an Ortec Energy Dispersive x-ray fluorescence instrument. Composition results are shown in Table 1. Because of the differences in composition of bone char and carbon, x-ray fluorescence is used to determine char-carbon composition of mixtures separated by electrostatics. This method determines concentrations for seven different elements.

TABLE 1

Composition of Bone Char and Granular Activated Carbon by X-Ray Fluorescence

| | % of Component | |
|---|---|---|
| Element | Bone Char* | Granular Carbon* |
| Calcium | 15.6–26.1 | 0.256–0.430 |
| Phosphorus | 8.96–17.23 | 0.018–0.296 |
| Silicon | 2.19–4.50 | 0.637–2.24 |
| Iron | 0.17–0.243 | 0.494–0.764 |
| Aluminum | 1.37–3.60 | 0.002–0.960 |
| Potassium | 0.29–0.476 | 0.098–0.186 |
| Sulfur | 0.34–0.669 | 0.620–1.53 |

*Range represented by 9 samples.

The following examples illustrate but are not intended to limit the preferred embodiment of the invention:

EXAMPLE 1

Separation of Carbon from Bone Char 1:4 Ratio

One gram of a mixture of 1 part by weight of carbon to 4 parts by weight char was placed in the center of an A.C. electric undulating traveling wave contact panel after drying the sample in an oven for 30 minutes at 100° C. An initial 4 kV voltage was applied to the panel for 40 sec. Carbon particles became highly charged and levitated from the surface of the panel while char particles became negligibly charged and remained on the surface of the panel. The voltage was then increased to about 5 kV for approximately 10 seconds. The highly charged carbon particles moved on an electric wave in all directions from the center off the panel. The majority of the particles moved perpendicular to the grid lines of the panel. Mechanical agitation was also used to redistribute and maintain the electrical charge on the particles. This was accomplished by gently agitating the particles in the center of the panel with a sable brush during the cycling process. The cycle was completed by reducing the voltage to 4 kV for another 40 second interval. The panel was recycled using the same voltages and times as above stated until separation of the carbon particles from the bone char particles occurred. Three cycles were necessary for essentially complete separation. The highly charged carbon particles which moved off the panel were collected at the edge of the panel and analyzed by x-ray fluorescence to determine efficiency and purity of separation. Results based on analysis of phosphorus indicate that 87% of the char remained on the surface of the panel.

EXAMPLE 2

Separation of Carbon from Bone Char 1:1 Ratio

One gram of a mixture of 1 part by weight of carbon to 1 part by weight of char was placed in the center of an A.C. electric undulating traveling wave contact panel after drying the sample in an oven for 30 minutes at 100° C. The same procedure was followed as in Example 1. Results based on phosphorus analysis indicate that 80.4% of the char remained on the surface of the panel.

EXAMPLE 3

Pure Carbon

One gram of pure carbon was placed in the center of an A.C. electric undulating traveling wave contact panel after drying the sample in an oven for 30 min at 100° C. An initial 4 kV voltage was applied to the panel for 40 sec. The particles became highly charged and levitated from the surface of the panel. The voltage was then increased to about 5 kV for approximately 10 sec. The highly charged carbon particles moved in all directions from the center of the panel with the majority moving perpendicular to the grid lines of the panel. During the cycling process the particles were gently agitated in the center of the panel with a sable brush. The voltage was then reduced to 4 kV for 40 sec thereby completing the cycle. The panel was cycled for three times or until all of the carbon had moved off the panel and was collected off the edge. The collected carbon particles were then weighed. Results indicated that 99.9% of the carbon had been removed from the panel.

EXAMPLE 4

Pure Bone Char

Three grams of pure bone char was placed in the center of an A.C. electric undulating traveling wave contact panel after drying the sample in an oven for 30 min at 100° C. An initial 4 kV voltage was applied to the panel for 40 sec. The particles were at most negligibly charged and did not move or levitate from the surface at the center of the panel. The voltage was then increased to about 5 kV for approximately 10 seconds. The uncharged bone char particles showed little or no movement from the center surface of the panel. During the cycling process the particles were gently agitated in the center with a sable brush, shown schematically at D, to try to maintain or impose an electrical charge on the particles. The mechanical agitation had no appreciable effect on the bone char particles. The voltage was then reduced to 4 kV for 40 sec thus completing the cycle. The panel was cycled for three times without any appreciable movement of char particles. The char particles were removed from the surface of the panel and weighed and results indicated that 99.7% of the bone char material had remained on the surface of the panel.

Conclusions

Separation of char carbon mixtures using an undulating traveling wave A.C. electric contact panel is possible because most of the carbon is ejected from the panel with bone char remaining on the surface of the panel. Separation of such mixtures can be complicated by char composition. Minute samples of bone char with high elemental carbon content can behave like carbon in the electric field resulting in some char carryover with the carbon. Furthermore, separation occurs best when sample is predried before subjecting to an electric panel surface. Mechanical agitation is very beneficial for separation to overcome shielding of the carbon particles by bone char particles. Total separation may require more than one cycle.

Successful separation depends upon the following parameters: The charging potential is 4.2 to 4.9 kV; the separating potential is 5.0 to 6.2 kV. Separation begins at about 3.0 kV and improves when impulsed up to about 6.0 kV. The time for charging can be from about 20 to 150 seconds and the separating potential time can be from about 5 to 60 seconds.

We claim:

1. An electrodynamic method for separating components of a mixture comprising:
   (a) feeding onto a horizontal electric undulating traveling wave contact panel a mixture of particles, said mixture comprised of negligibly charged and charged particles;
   (b) energizing the panel with sufficient A.C. voltage for sufficient time to impart different charge to mass ratios to the individual particles;
   (c) increasing the potential for sufficient time to a separation voltage; said separation voltage being that which is sufficient to move said charged particles away from said negligibly charged particles;
   (d) separating the individual particles by cyclically repeating steps (b) and (c) until all of the charged particles are moved off the panel and the negligibly charged particles remain on the panel.

2. The electrodynamic method of claim 1 including mechanically agitating the particles in the center of the panel after step (c).

3. The method of claim 2 wherein the particles which can be charged are carbon and the particles which can be only negligibly charged are bone char.

4. The method of claim 3 wherein the particle mixture is a ratio of 1:4 carbon to bone char by weight.

5. The method of claim 3 wherein the particle mixture is a 1:1 carbon to bone char by weight.

6. The method of claim 3 wherein the charging time is from about 20 to 150 seconds and the charging voltage is from about 4.0 to 5.0 kV.

7. The method of claim 3 wherein the separation time is from about 5 to 60 seconds and the separation voltage is from about 4.5 to 6.5 kV.

8. The method of claim 3 including an additional step of drying the mixture before feeding onto the panel.

* * * * *